(12) United States Patent
Lombrozo et al.

(10) Patent No.: US 11,697,418 B2
(45) Date of Patent: Jul. 11, 2023

(54) ROAD FRICTION AND WHEEL SLIPPAGE ASSESSMENT FOR AUTONOMOUS VEHICLES

(71) Applicant: Waymo LLC, Mountain View, CA (US)

(72) Inventors: Peter Craig Lombrozo, Scotts Valley, CA (US); Courtney McCool, San Jose, CA (US); Daniel Lynn Larner, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 163 days.

(21) Appl. No.: 16/123,567

(22) Filed: Sep. 6, 2018

(65) Prior Publication Data

US 2020/0079381 A1     Mar. 12, 2020

(51) Int. Cl.
*B60W 30/18*       (2012.01)
*G05D 1/02*        (2020.01)
(Continued)

(52) U.S. Cl.
CPC ...... *B60W 30/18172* (2013.01); *B60W 10/20* (2013.01); *B62D 6/003* (2013.01); *G05D 1/0223* (2013.01); *G05D 1/0276* (2013.01); *B60W 2520/06* (2013.01); *B60W 2520/10* (2013.01); *B60W 2520/105* (2013.01);
(Continued)

(58) Field of Classification Search
CPC ........... B60W 30/18172; B60W 10/20; B60W 2552/40; B60W 2556/45; B60W 2520/06; B60W 2520/10; B60W 2520/105; B60W 2520/14; B60W 2520/26; B60W 2520/28;
(Continued)

(56) References Cited

U.S. PATENT DOCUMENTS 4,763,960 A * 8/1988 Uchida ................... B60T 8/344
                                                     303/166
6,292,735 B1 * 9/2001 Kimbrough ......... B60T 8/17616
                                                       701/72
(Continued)

OTHER PUBLICATIONS

"https://www.continental-tires.com/car/media-services/visionzeroworld/latest-news/2017-04-04-road-condition-observer" https://www.continental-tires.com/car/media-services/visionzeroworld/latest-news/2017-04-04-road-condition-observer , downloaded Jul. 2018 (4 pgs.).

(Continued)

*Primary Examiner* — Jess Whittington
*Assistant Examiner* — Terry C Buse
(74) *Attorney, Agent, or Firm* — Botos Churchill IP Law

(57) ABSTRACT

The disclosure relates to assessing and responding to wheel slippage and estimating road friction for a road surface. For instance, a vehicle may be controlled in an autonomous driving mode in order to follow a trajectory. A wheel of the vehicle may be determined to be slipping such that the vehicle has limited steering control. In response to determining that the wheel is slipping, steering of one or more wheels may be controlled in order to orient the one or more wheels towards the trajectory in order to allow the vehicle to proceed towards the trajectory when the wheel is no longer slipping. In addition, the road friction may be estimated based on the determination that the wheel is slipping. The vehicle may be controlled in the autonomous driving mode based on the estimated road friction.

23 Claims, 14 Drawing Sheets

(51) Int. Cl.
  *B62D 6/00* (2006.01)
  *B60W 10/20* (2006.01)
(52) U.S. Cl.
  CPC ..... *B60W 2520/14* (2013.01); *B60W 2520/26* (2013.01); *B60W 2520/28* (2013.01); *B60W 2552/40* (2020.02); *B60W 2556/45* (2020.02); *B60W 2710/207* (2013.01); *B60W 2720/106* (2013.01); *B60W 2720/24* (2013.01)
(58) Field of Classification Search
  CPC ........ B60W 2720/106; B60W 2720/24; B62D 6/003; G05D 1/0223; G05D 1/0276
  USPC ............................................................ 701/2
  See application file for complete search history.

(56) References Cited

U.S. PATENT DOCUMENTS

| | | | |
|---|---|---|---|
| 8,271,133 B2* | 9/2012 | Park | G05D 1/0272 901/1 |
| 8,874,305 B2 | 10/2014 | Dolgov et al. | |
| 9,233,692 B2 | 1/2016 | Zagorski | |
| 9,475,500 B2 | 10/2016 | Grimm et al. | |
| 2006/0191730 A1* | 8/2006 | Alden | B60K 28/06 180/272 |
| 2012/0083947 A1* | 4/2012 | Anderson | G08G 1/165 701/3 |
| 2012/0136506 A1* | 5/2012 | Takeuchi | B60G 17/016 701/1 |
| 2012/0185122 A1* | 7/2012 | Sullivan | B65G 1/0492 701/23 |
| 2013/0144476 A1* | 6/2013 | Pinto | B60T 8/17555 903/930 |
| 2013/0245890 A1* | 9/2013 | Kageyama | B62D 5/001 701/41 |
| 2014/0277984 A1* | 9/2014 | Pietron | B60T 8/1761 903/947 |
| 2014/0288752 A1* | 9/2014 | Makino | B60L 3/106 701/22 |
| 2015/0344038 A1* | 12/2015 | Stenneth | G07C 5/008 340/439 |
| 2016/0046287 A1* | 2/2016 | Owen | B60W 10/04 701/43 |
| 2016/0133131 A1* | 5/2016 | Grimm | G08G 1/0141 701/117 |
| 2016/0280192 A1* | 9/2016 | Seto | B60T 8/175 |
| 2016/0280193 A1* | 9/2016 | Seto | B62K 5/05 |
| 2017/0088193 A1* | 3/2017 | Heil | G01M 9/06 |
| 2017/0115662 A1* | 4/2017 | Mori | B60W 10/04 |
| 2018/0043900 A1 | 2/2018 | Sabri et al. | |
| 2018/0046186 A1* | 2/2018 | Miller | B60W 10/06 |
| 2018/0105181 A1 | 4/2018 | Skold et al. | |
| 2018/0134291 A1* | 5/2018 | Burford | B60K 31/00 |
| 2018/0154777 A1 | 6/2018 | Hall et al. | |
| 2018/0346019 A1* | 12/2018 | Fujii | B62D 1/286 |
| 2019/0071084 A1* | 3/2019 | Tuncali | B60W 30/165 |
| 2019/0113924 A1* | 4/2019 | Falconer | B60W 60/001 |
| 2019/0256103 A1* | 8/2019 | Capua | B60W 40/101 |
| 2019/0322255 A1* | 10/2019 | Krucinski | B60T 8/17616 |
| 2020/0102008 A1* | 4/2020 | Pasquet | B60T 8/1755 |
| 2022/0194414 A1* | 6/2022 | Yu | B60W 40/109 |

OTHER PUBLICATIONS

Vaisala, "Vaisala Road Surface State Sensor DSC111" (2010) 2 pgs.
Vaisala, "Weather Transmitter WXT530 Series" (2017) 3 pgs.
Vaisala, "Present Weather and Visibility Sensors PWD10, PWD12, PWD20, and PWD22" (2017) 4 pgs.
G. Lufft Mess-und Regeltechnik GmbH, "User Manual MARWIS/StaRWIS, Operating Manual", V 3.0 / Mar. 23, 2017 (56 pgs.).
Aguilar, et al., "Robust Road Condition Detection System Using In-Vehicle Standard Sensors", (2015) 23 pgs.
http://www.lufft-marwis.com/en_US/features, downloaded Jul. 2018 (3 pgs.).
https://www.driverknowledgetests.com/resources/how-much-distance-should-you-leave-when-you-stop-behind-another-vehicle/, downloaded Aug. 28, 2018, 4 pgs.
https://www.wheels.ca/top-ten/top-10-ways-to-prevent-a-rear-end-collision/, downloaded Aug. 28, 2018, 7 pgs.
Khaleghian, Seyedmeysam, et al., "A Technical Survey on Tire-Road Friction Estimation", (2017) 24 pgs.

* cited by examiner

ROAD FRICTION AND WHEEL SLIPPAGE ASSESSMENT FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. In order to do so, such vehicles are typically equipped with various types of sensors in order to detect objects and other features in the vehicle's surroundings.

BRIEF SUMMARY

One aspect of the disclosure provides a method of assessing and responding to wheel slippage. The method includes controlling, by one or more processors, a vehicle in an autonomous driving mode in order to follow a trajectory along a route to a destination; determining, by the one or more processors, that a wheel of the vehicle is slipping such that the vehicle has limited steering control; and in response to determining that the wheel is slipping, controlling, by the one or more processors, steering of one or more wheels to orient the one or more wheels towards the trajectory in order to allow the vehicle to proceed towards the trajectory when the wheel is no longer slipping.

The method of claim 1, wherein controlling the vehicle in order to follow a trajectory includes attempting to make a turn and wherein determining that the wheel is slipping is based on a difference between an actual yaw angle of the vehicle and an expected yaw angle of the vehicle during the attempt. In this example, the method also includes determining the expected yaw angle using a programmed driving sequence to establish a baseline performance for the vehicle. In addition or alternatively, determining the expected yaw angle from a steering command for the vehicle. In addition or alternatively, determining the expected yaw angle using an expected coefficient of friction for a road surface. In another example, controlling the vehicle in order to follow a trajectory includes attempting to accelerate or decelerate the vehicle and wherein determining that the wheel is slipping is based on a change in a speed of the vehicle during the attempt. In this example, the method also includes determining the change in the speed of the vehicle during the attempt based on feedback from a wheel speed sensor of the wheel and a speed of the vehicle determined by the one or more processors. In another example, the trajectory is periodically updated by the one or more processors, and the method also includes determining that the steering of the one or more wheels can no longer be controlled to orient the one or more wheels towards the trajectory, and when the steering of the one or more wheels can no longer be controlled to orient the one or more wheels towards the trajectory, steering the one or more wheels in order to regain traction such that the vehicle is no longer moving along the route. In this example, determining that the steering of the one or more wheels can no longer be controlled to orient the one or more wheels towards the trajectory is further based on whether the steering of the one or more wheels has met a maximum threshold value corresponding to a steering limit of the vehicle. In addition or alternatively, determining that the steering of the one or more wheels can no longer be controlled to orient the one or more wheels towards the trajectory is further based on whether a heading of the vehicle is such that the wheels of the vehicle cannot physically be oriented towards the trajectory. In another example, the method also includes using inertial estimates from a prior precise position estimate for the vehicle when steering of one or more wheels to orient the one or more wheels towards the trajectory.

In another example, the method also includes estimating road friction for a road surface based on the determination that the wheel is slipping and controlling the vehicle in the autonomous driving mode based on the estimated road friction. In this example, controlling the vehicle in the autonomous driving mode based on the estimated road friction includes modifying steering, acceleration and deceleration profiles. In addition or alternatively, controlling the vehicle in the autonomous driving mode based on the estimated road friction includes modifying steering, acceleration and deceleration limits. In addition or alternatively, the method also includes sending the estimated road friction to a remote server computing device. In this example, the method also includes receiving estimated road friction data generated by other vehicles from the remote server computing device identifying a low friction area and routing the vehicle in order to avoid the low friction area. In addition or alternatively, the method also includes receiving estimated road friction data generated by other vehicles from the remote server computing device identifying a low friction area and when the vehicle is approaching the low friction area, increasing an error tolerance of localization of the vehicle. In addition or alternatively, controlling the vehicle in the autonomous driving mode based on the estimated road friction includes adjusting how the vehicle responds to other objects. In this example, adjusting how the vehicle responds to other objects includes estimating that another object is likely to have decreased steering control. In addition or alternatively, adjusting how the vehicle responds to other objects includes increasing a default buffer distance to a first vehicle in front of the vehicle by an additional buffer distance, and reducing the additional buffer distance as a second vehicle approaches the vehicle from behind.

DETAILED DESCRIPTION

Overview

Figure 1:
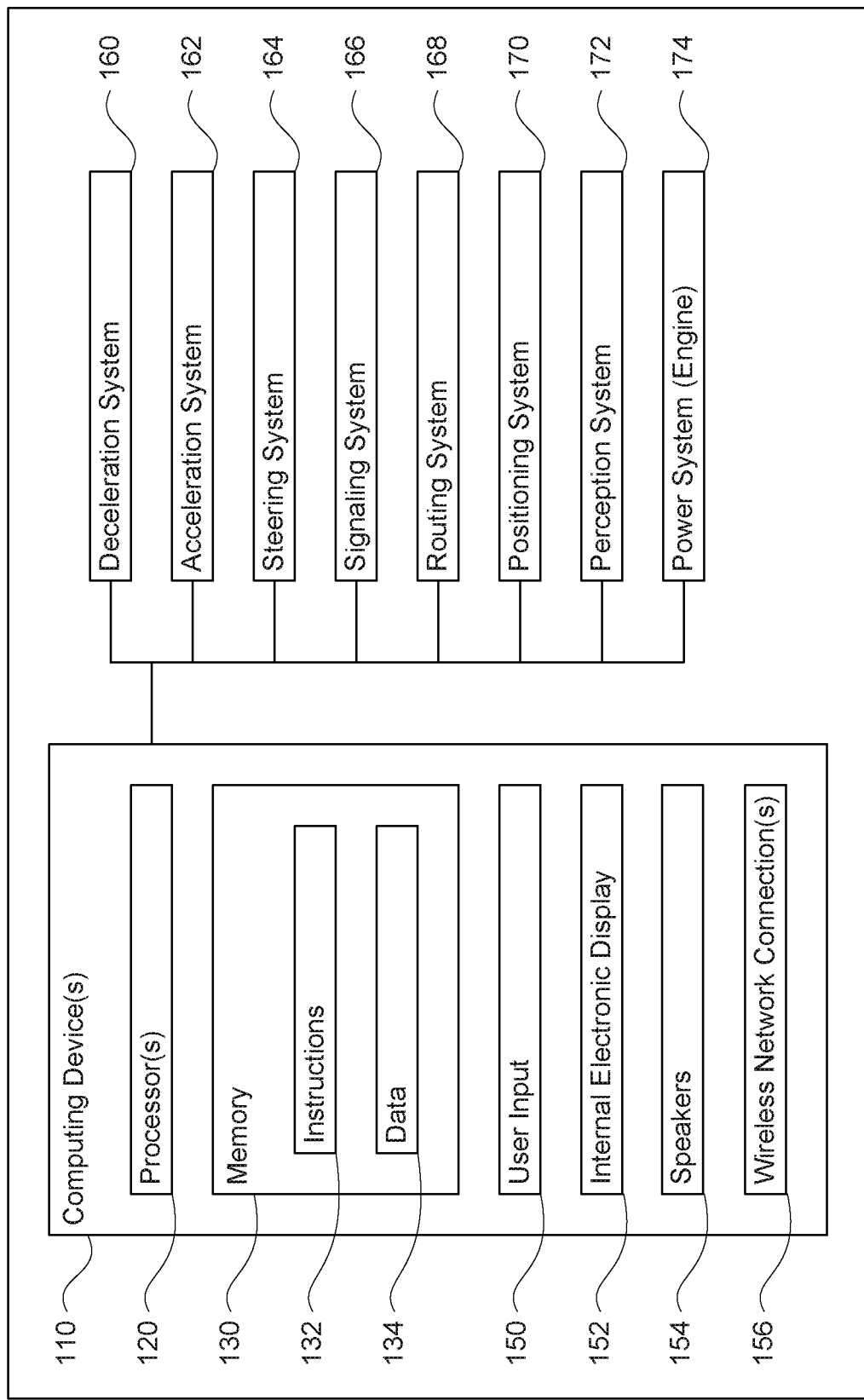
FIG. 1 is a functional diagram of an example vehicle in accordance with an exemplary embodiment.

This technology relates to assessing road friction and wheel slippage for autonomous vehicles in order to better estimate stopping distance and handling limits and behaviors for such vehicles. This may be especially useful and important when the road surface is wet, icy, dirty, gravelly, etc. Various approaches may be used alone or in any combination in order to better assess road friction and wheel slippage. Once road friction and/or wheel slippage has been assessed, this may be used to make driving decisions for the vehicle.

Various approaches may be used to estimate the road friction and/or wheel slippage. As one approach, during execution of a turn the vehicle's computing devices may evaluate the actual vehicle yaw angle. An actual yaw angle may be measured, for instance, using gyroscopes and/or accelerometers that determine changes in orientation. The difference between the actual yaw angle and an expected yaw angle may be indicative of the amount of friction on the road surface as well as road slippage. As another approach, each time the vehicle actively decelerates or accelerates (i.e. uses the brakes to decrease or the accelerator to increase the speed of the vehicle), the vehicle's computing devices may evaluate the vehicle's actual change in speed to detect road friction and wheel slippage. In addition or alternatively, measured rotational wheel speed may be compared to expected wheel rotation speed to determine road friction and wheel slippage. In some instances, the vehicle's computing devices may access map information that incorporates regions where other vehicles should not be located or indicate their proper heading. In addition, road surface conditions may also be predicted from sensor data, infrastructural elements, weather reports, etc.

The aforementioned approaches may be used alone or in any combination to estimate the road friction and wheel slippage. For instance, for each additional determination that the coefficient of friction is low, this may increase the likelihood that the road friction is low and therefore decrease the responsiveness of the vehicle.

The aforementioned slippage and road friction assessments may be used in various ways. For instance, the vehicle's computing devices may periodically determine a trajectory or path for the vehicle in order to follow a route to a destination. In a case where one or more wheels of the vehicle is slipping, the vehicle may attempt to rotate its wheels towards its prior trajectory such that when traction is regained, the vehicle's wheels are properly oriented. However, at some point, the vehicle's orientation may be such that the wheels can no longer be rotated towards the prior trajectory. At this point, once the angle of the wheels can no longer be aligned with the prior trajectory (which will of course, be dependent upon the amount of angular steering or turning radius of the vehicle), the vehicle's wheels may be rotated towards or away from the heading of the vehicle while the vehicle is skidding in order to help the vehicle regain traction. In some instances, when the estimated road friction is low, the vehicle's computing devices may identify a "safety zone" around current trajectory which allows for an increased buffer in movements and handling. As another example, based upon the estimated road friction, the vehicle's computing devices may modify the vehicle's steering, acceleration and deceleration profiles and limits.

The vehicle's computing devices may also send the estimated road friction and other data to remote computing devices, such as a backend server computing device and/or the computing devices of other vehicles of a fleet of vehicles. With this information, the fleet of vehicles could route themselves in order to avoid these areas, for instance, by re-routing, for some predetermined period of time, for instance, until temperatures rise, etc. When providing transportation services, the aforementioned map information may allow the vehicle to avoid pickup and drop-offs of passengers that overlap with low friction areas.

In addition, the vehicle's computing devices may use the estimated road friction to adjust how the vehicle interacts with other objects. For instance, the vehicle's computing devices may adjust the vehicle's algorithms or behavior models that predict how other road users will move, react, etc. This, in turn, may be used to change the way the vehicle responds to these other objects.

In addition, by incorporating machine learning into the estimated road friction data gathered over time, observed low friction patterns on a map can be used to anticipate those hazardous driving areas. For instance, the machine learning can be combined with observed weather data. If weather conditions are right to form ice on the roads and we start to detect a typical ice pattern on the road, the vehicle's computing devices may anticipate that ice will form in typical places like over bridges, in shadows, in poor drainage areas, etc. For example, (without detecting that it is raining) these methods could map low friction areas created by puddles. In the future, when the vehicle suddenly passes over enough puddles to indicate a significant change from the expected friction levels (i.e. that it is raining), the vehicle's computing devices can expect puddles in the "usual" spots thanks to previously detected patterns. Similar applications of machine learning could be implemented to monitor and anticipate road wear, ice patches, etc.

The features described herein provide for a real time assessment of road friction. This, in turn, may be used to control the vehicle more safely and effectively in situations where the road friction is very low. Moreover, since the aforementioned methods can be frequently evaluated, small changes in the expected yaw angle or rotational wheel speed can be routinely updated to account for wheel wear and geographic location and changing road surfaces. In addition, the vehicle is able to assess the effect of road weather conditions (snow, ice, rain, etc.) on the vehicle without having to actually detect those conditions directly. These features, along with other information such as temperature, humidity, and other weather data, can be used over time to determine degrading friction conditions indicating the onset of icing, puddling, etc. to predict hazardous driving areas to avoid in the near future.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 132 of memory 130. For instance, the memory may store steering, acceleration and deceleration profiles and limits for the vehicle which can be used to determine how to control the various systems of the vehicle. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
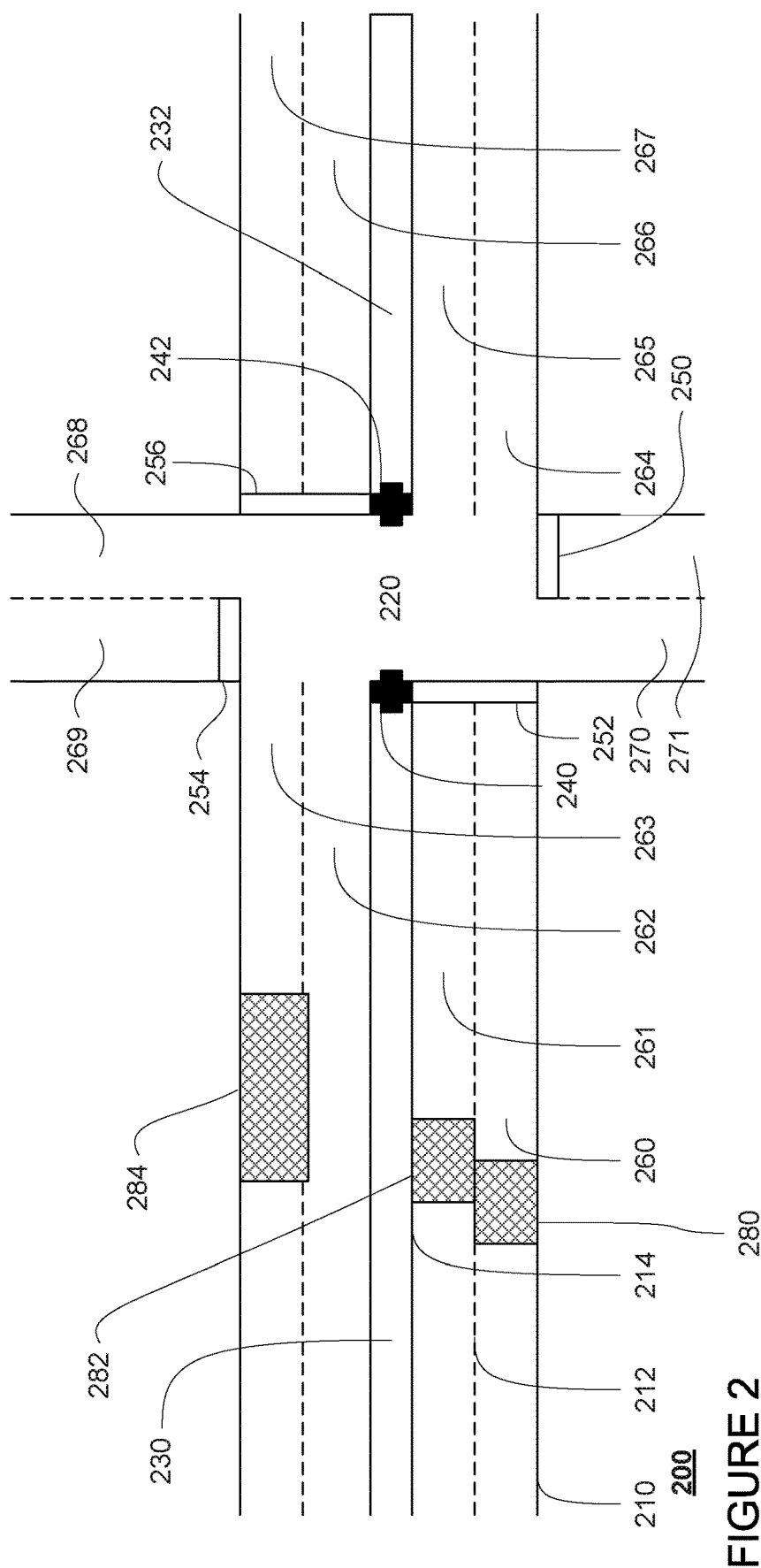
FIG. 2 is an example of map information in accordance with aspects of the disclosure.

FIG. 2 is an example of map information 200 for a section of roadway including intersection 220. FIG. 2 depicts a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

In some instances, the map information may identify low friction areas. For instance, map information 200 includes low friction areas 280, 282, 284. These low friction areas may be associated with location information (i.e. latitude and longitude coordinates) as well as details such as estimated road friction, date and time the estimate was made, whether the area is one that is likely to form puddles or ice depending upon the temperature and weather conditions, whether the area of low friction These details may also include other types of information such as a percent of road covered by a low friction area (this may provide an indication of whether the low friction area is likely to affect only one wheel vs all of the wheels), confidence levels (for instance, how likely is it that the vehicle would have a slip event in the next XX minutes in this low friction area), factors that could affect ease of regaining traction, such as material or macro-texture of road or typical coefficient of friction for clean and dry conditions, road camber and grade (for instance, a low friction area on a steep hill could be more significant than on a level road), available stopping distance or distance to next road feature (for instance, a low friction area just before a curve or before an intersection may be more significant than on a straight road section without upcoming features), etc. In some instances, one or more low friction areas of the map information may include a parameter for traction severity from a calculation that uses many situational parameters including, for instance, a friction coefficient, speed limit, vehicle weight, road geometry, confidence level, distance to next road feature, a percentage of the time that vehicle detects auxiliary vehicles when in that location, etc. These low friction areas may have been previously identified by the computing devices 110 and stored in the map information, or may have been received from remote computing devices, such as computing devices of other vehicles, such as vehicle 100A, and/or a dispatching server computing devices, such as server computing devices 410, as discussed further below.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
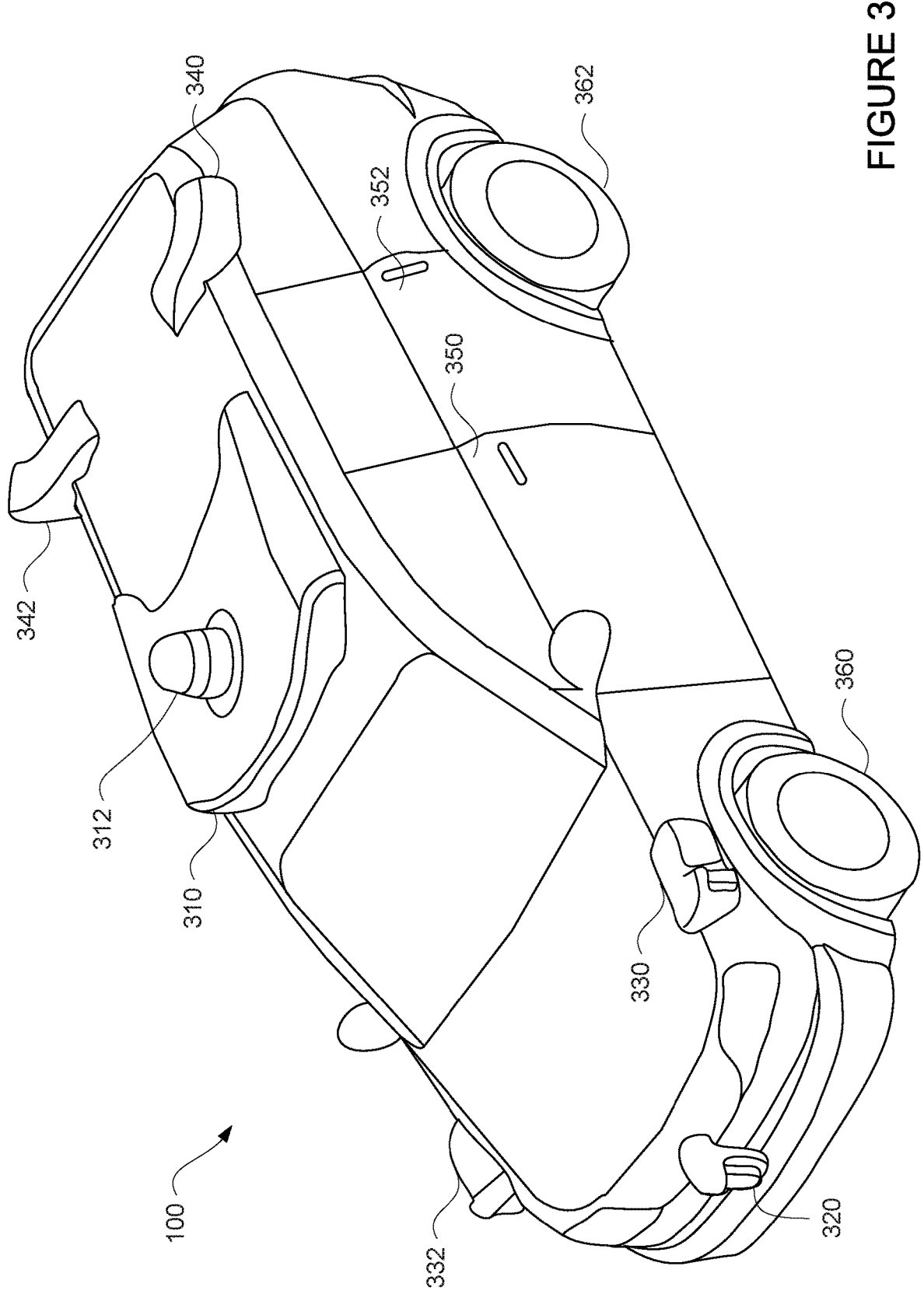
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, debris, ice or water on the road surface, etc. For example, the perception system 172 may include lasers, sonar, radar, cameras, microphones, and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine or motor by acceleration system 162), decelerate (e.g., by decreasing the fuel supplied to the engine or motor, changing gears, and/or by applying brakes or increasing electric regeneration by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine or motor of the vehicle and the wheels of the vehicle. Again, by controlling these systems, computing devices 110 may also control the drivetrain of the vehicle in order to maneuver the vehicle autonomously.

Figure 4:
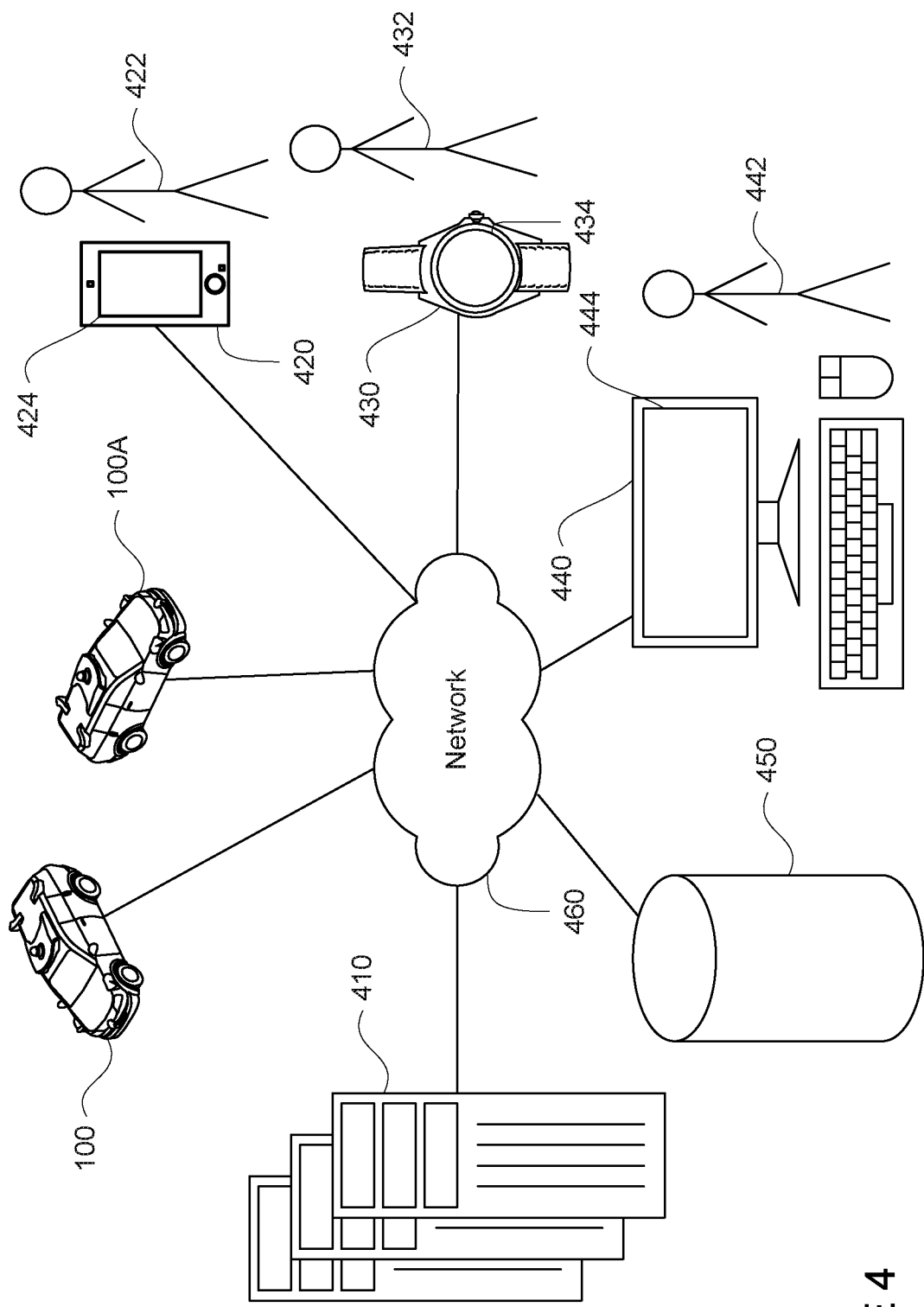
FIG. 4 is a pictorial diagram of an example system in accordance with aspects of the disclosure.
Figure 5:
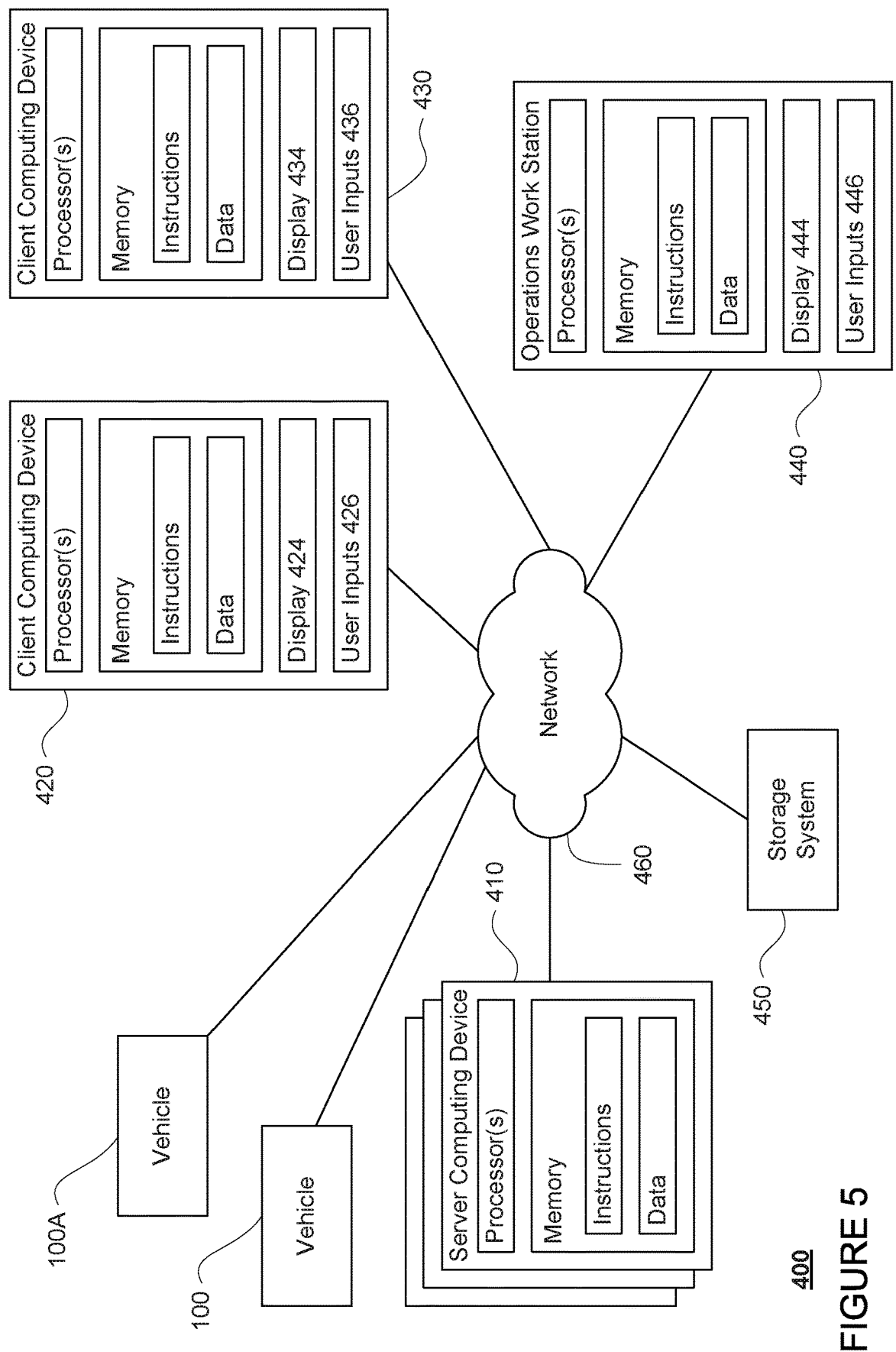
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A, which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information including various maps. These maps may include information reported by vehicles of the fleet relating to estimated road friction and other information. This information may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
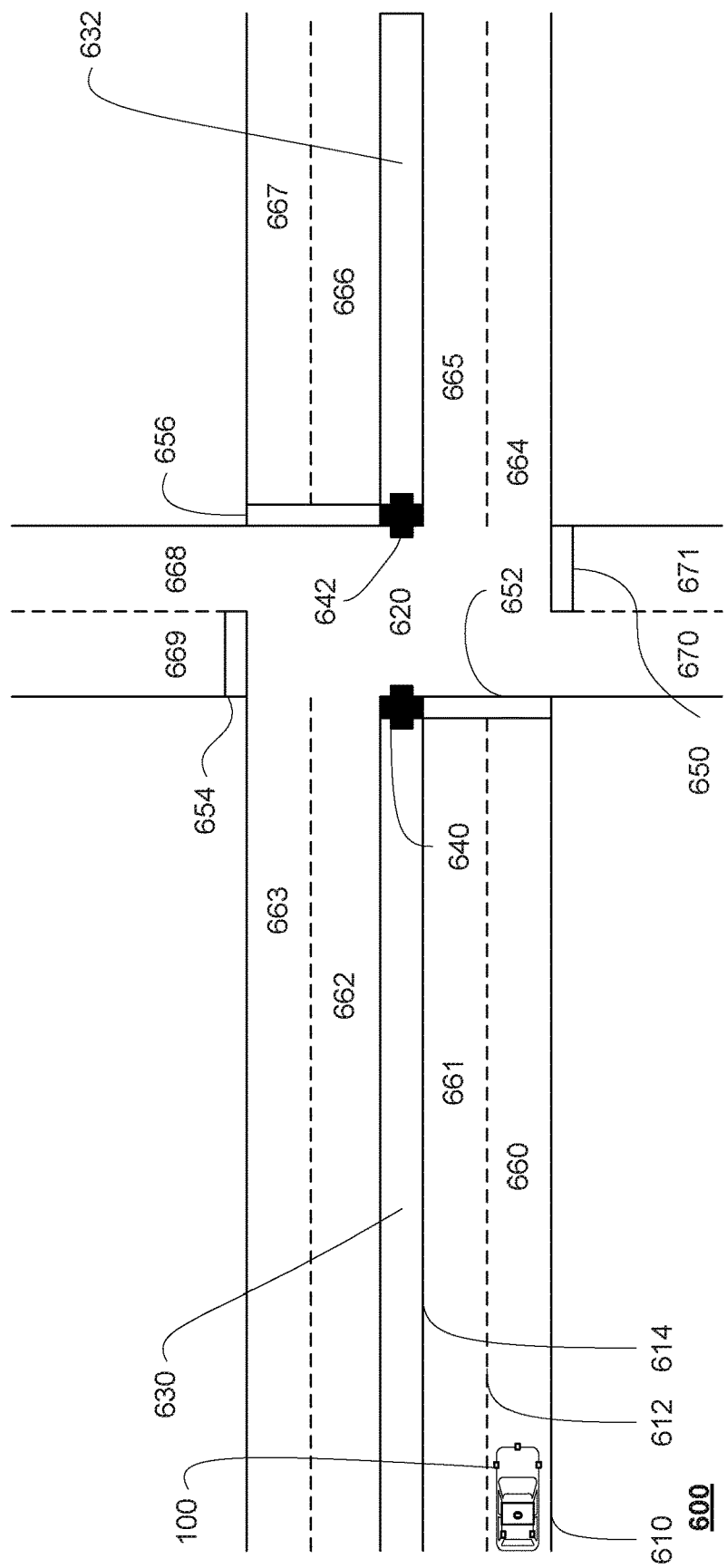
FIG. 6 is an example representation of a driving situation in accordance with aspects of the disclosure.

As noted above, the computing devices 110 may use the routing system to determine a route to a destination. The computing devices 110 may then periodically generate trajectories for the vehicle to follow for some time and distance into the future in order to follow the route. For instance, FIG. 6 represents a section of roadway 600 corresponding to map information 200. In this regard, lane lines 610, 612, 614, correspond to lane lines 210, 212, 214, intersection 620 corresponds to intersection 220, median areas 630, 632 correspond to median areas 230, 232, traffic signals 640, 642 correspond to traffic signals 240, 242, stop lines 650, 652, 654, 656 correspond to stop lines 250, 252, 254, 256, and lanes 660-671 correspond to lanes 260-271. Vehicle 100 is depicted as approaching intersection 620 in lane 660.

Figure 7:
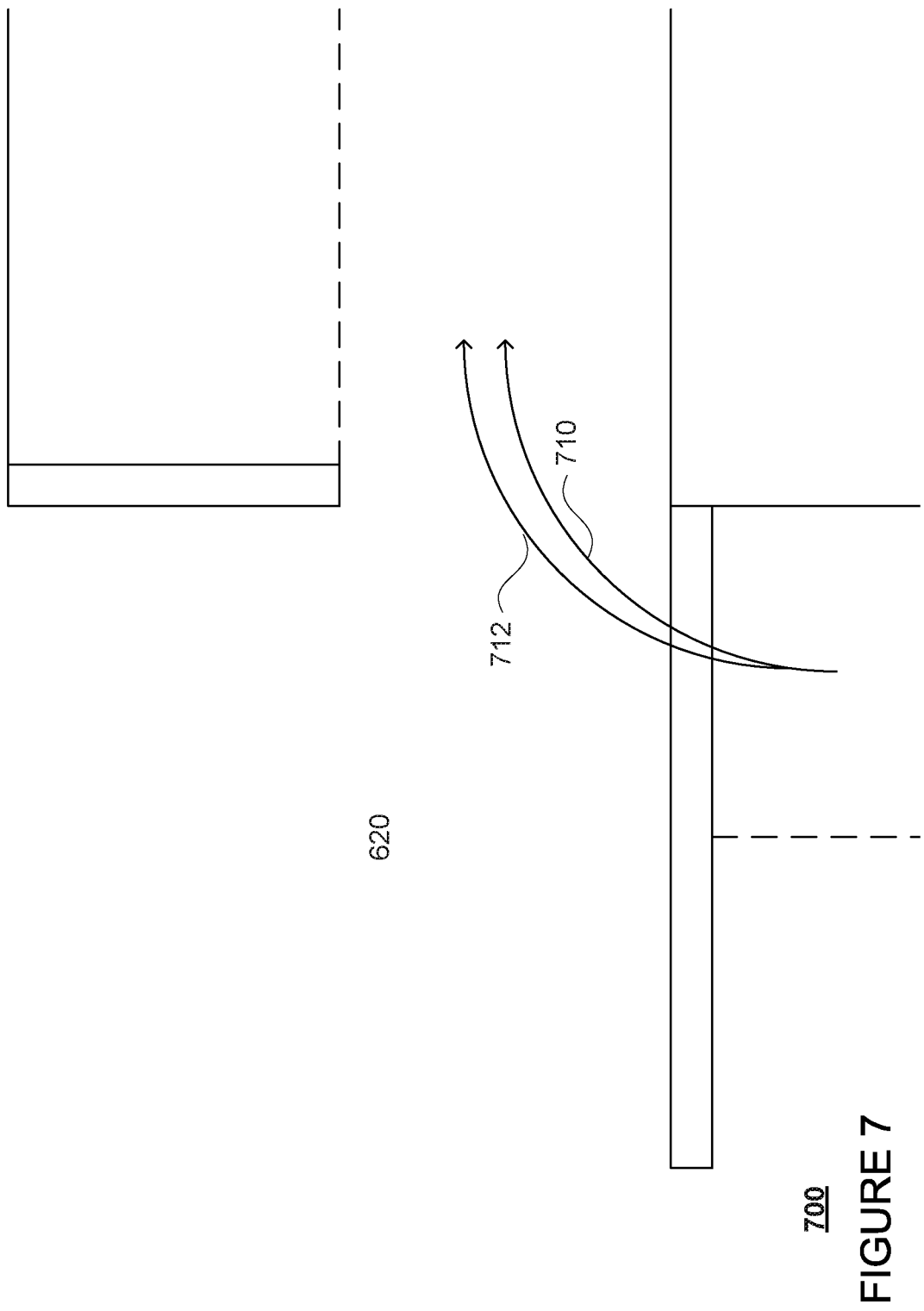
FIG. 7 is an example representation of a driving situation in accordance with aspects of the disclosure.

While following these trajectories, the vehicle's computing devices 110 may also attempt estimate road friction or the amount of friction between the road surface and the vehicle's tires and/or wheel slippage by the vehicle's wheels. As one approach, each time the vehicle executes a turn the vehicle's computing devices may evaluate the actual vehicle yaw angle and compare this to an expected yaw angle from the vehicle's trajectory or from the motion of the steering actuator. An actual yaw angle may be measured, for instance, using gyroscopes and/or accelerometers that determine changes in orientation. FIG. 7 is an example 700 of a portion of intersection 620 depicting two paths for making a right turn at intersection 620. Path 710 corresponds to an expected path of the vehicle according to an expected yaw angle for the turn. Path 712 corresponds to an actual path of the vehicle according to an actual yaw angle for the turn.

The difference between the actual yaw angle and an expected yaw angle may be indicative of the amount of friction on the road surface. For instance, during even the most ideal conditions, when the wheels are turned away from the direction of vehicle travel, such as when the vehicle initiates a turn at a corner, there is a lateral force generated where the tires contact the road surface. Returning to example 700, this lateral force moves path 710 (the expected path) towards path 712 (the actual path). The force is proportional to the amount of road friction and is related to the steering angle, normal force (weight), the friction coefficient, vehicle acceleration, tire pressure, tread parameters, road attitude, commanded acceleration and braking, among other parameters.

An expected yaw angle for any given steering change may thus be specific to each vehicle performing the maneuver and the characteristics of that vehicle. In that regard, the gyroscopes and accelerometers may be calibrated to the vehicle and thereafter, a short amount of training to identify expected yaw angles for different steering angles may be performed. For instance, a programmed driving sequence may be initiated causing the vehicle to follow a known course with a consistent surface friction (possibly an indoor course to avoid rain and ice). The course may even consist of a range of corners and acceleration/deceleration segments which would establish a baseline performance A calibration of the course friction may be performed routinely with a known reference vehicle or device to account for changes over time, temperature, humidity, tire wear condition, tread pattern changes, and inflation pressures for each tire, or for instance, each time the vehicle is turned on and/or the vehicle's sensors are re-calibrated.

Alternatively, rather than using a calibrated expected yaw angle as described above, the expected yaw angle may be determined from a steering command for the vehicle either as generated by the computing devices 110 or as feedback from the actuator controls. For instance, the steering command may include rotating the wheels so much as to cause the vehicle to execute a particular turn at a particular speed. This may be converted to an expected yaw angle for the vehicle. For example, a steering angle may be commanded by the vehicle to execute a turn using the calibrated relationship between steering command and vehicle motion. As the turn progresses the computing devices 110 may adjust the steering angle command to get the vehicle to follow the desired trajectory. The difference between the nominal (planned) steering actuator input and the corrected input would indicate a change in the physical properties of the vehicle including the road wheel friction.

As another alternative, the expected yaw angle may be determined based on an expected coefficient of friction determined from using data from various sources. For example, the vehicle's sensors may detect other potential low friction conditions, such as road wetness, ice patches, increased sand/gravel debris, road spray, etc. In addition or alternatively, expected friction coefficient could be a model of many different inputs. Each vehicle may be calibrated to create a relationship between steering angle and yaw incorporating several other system variables including normal force (weight), the friction coefficient, vehicle acceleration, tire pressure, tread parameters, road attitude, commanded acceleration and braking, load distribution (which can affect the normal force at each tire), among other parameters. Surfaces with different friction properties can be used to isolate the relationship between steering angle and yaw.

As noted above, the actual yaw angle may be compared to the expected yaw angle. If the actual yaw angle is slightly greater than the expected yaw angle this may indicate an increase in road friction which may be useful, but of less concern. If the yaw exceeds the expected value by a threshold amount this could indicate the loss of traction of the rear wheels and the initiation of a spin. If the actual yaw angle is less than the expected yaw angle, this may indicate a decrease in road friction (i.e. greater than under ideal condition). In this regard, an actual coefficient of friction need not be determined for the road surface, but rather, the greater the magnitude of the difference, the greater the difference between the ideal conditions and actual conditions, and the higher or lower the coefficient of friction. For instance, the magnitude of the difference may be compared to a threshold. If the magnitude meets or exceeds the threshold, this may indicate that the road friction is relatively low and that one or more wheels of the vehicle are slipping or are likely to slip.

As another approach, each time the vehicle actively decelerates or accelerates (i.e. uses the brakes to decrease or the accelerator to increase the speed of the vehicle), the computing devices 110 may evaluate the vehicle's actual change in speed. The computing devices 110 may receive sensor feedback from wheel speed sensors, one at each wheel, which measure speed of each wheel. The speed of each wheel can be compared by the computing devices 110 to the vehicle speed as determined by the computing devices 110 for instance by using a speedometer or other speed determinations such as those that calculate differences in position. A difference between the values may indicate wheel slippage. Alternatively, some vehicles may have a single, differential-mounted sensor that provides feedback instead of individual wheel sensors. Data from this sensor could still give an indication of vehicle speed, which could be compared to the speed determined by the computing devices 110.

During even the most ideal conditions, each time the vehicle applies the brakes or the accelerator there will be some amount of wheel slip. The rotational speed of each wheel can be compared with each other by monitoring each of the wheel speed sensors (one per wheel). For instance, a slipping wheel will have a higher wheel speed when accelerating and a lower wheel speed when braking. For instance, during braking, the brakes may have little to no difficulty stopping a wheel's rotation on an ice patch. In a vehicle with anti-lock brakes, this may likely trigger a rapid release-re-apply response from the brake control module, which would be used to determine a loss of friction or wheel slippage. In any event, a significant difference in the actual and expected rotational speeds may indicate wheel slippage. The amount of slip is inversely proportional to the amount of road friction and is related to the steering angle, normal force (weight), the friction coefficient, vehicle acceleration, tire pressure, tread parameters, road attitude, commanded braking, among other parameters. This information may even be determined automatically by the vehicle's systems and sent to the computing devices 110 for further processing, for instance as an error indicating that the vehicle's wheels are slipping.

As noted above, a measured rotational wheel speed (how much the tires actually rotate) may be compared to the expected wheel rotation speed (how much the tires are expected to rotate). If the measured rotational wheel speed is less than the expected wheel rotation speed, this may indicate relatively high road friction, which may be useful, but of less concern. If the measured rotational wheel speed is greater than the expected wheel rotation speed, this may indicate a relatively low road friction. The measured wheel rotation speed may be determined for instance, from an inertial measurement unit, such as GPS, gyroscopes, accelerometers, radar Doppler, LIDAR data from known static objects, etc. Expected wheel rotational speed, may be determined from actuation commands to the various acceleration, deceleration, and/or power systems sent by the computing devices 110 in order to follow a trajectory. Again, an actual coefficient of friction need not be determined for the road surface, but rather, the greater the magnitude of the difference, the greater the difference between the ideal conditions and actual conditions, and the higher or lower the coefficient of friction. This magnitude of the difference can then be used as a variable representing friction in future vehicle routing/acceleration calculations.

When the expected rotational wheel speed is less than the actual wheel rotation speed, the magnitude of the difference may be compared to a threshold. If the magnitude is lower than the threshold, this may indicate that one or more of the wheels of the vehicle are slipping. In some instances, this assessment may be made on a per-wheel basis in order to identify whether there is a particular problem with or under (at the road surface) a specific wheel. This could even be used to flag the vehicle for review by a mechanic or other operator in order to determine whether that specific wheel has low tread (is "bald") or has some other problem.

In some instances, the computing devices 110 may access map information that incorporates regions where other vehicles should not be located (medians, lawns, etc.) or indicate their proper heading (which direction should traffic be moving). If the computing devices 110 detect other vehicles in those regions or that are not properly aligned with traffic, the computing devices 110 can anticipate a low friction zone ahead. In other words, this may allow the vehicle to determine that another vehicle has spun out or slid off the road when other vehicles are already located in places where they should not be located. This, in turn, may indicate that the road friction is relatively low and that one or more wheels of the vehicle are likely to slip.

Road surface conditions, including friction, and can also be estimated from sensor data. At least some of this sensor data may be generated by the vehicle's perception system. For instance, LIDAR sensor data including intensities, radar polarization ratios, and IR surface characteristics may be used to estimate road surface friction. Other sources of sensor data may include infrastructural elements (e.g. trains or stationary measurement devices), acoustic approaches, weather reports, etc. which may be received periodically by the computing devices 110 over network 460.

As yet another example, if wheel slippage is detected at one or both of the front wheels of the vehicle at a particular location, this may be used as a signal to detect or anticipate slippage when one or both of the rear wheels of the vehicle reach the location.

The aforementioned approaches may be used alone or in any combination to estimate the road friction. For instance, for each additional determination that the coefficient of friction is low, this may increase the likelihood that the road friction is low and therefore increase the responsiveness of the vehicle. For example, if other vehicle sensors detect patches of ice or water or an increase in aerial debris (sand/gravel kick-up), these may indicate road conditions with less than expected friction for asphalt. Combining these indications from various sensors may improve confidence in a system-level road friction model.

The aforementioned slippage and road friction assessments may be used in various ways. For instance, if one or more of the wheels of the vehicle is slipping or likely to slip, this may indicate that the vehicle may have limited or no steering control. As noted above the computing devices 110 may periodically determine a trajectory or path for the vehicle in order to follow a route to a destination. In a case where one or more wheels of the vehicle is slipping at least a predetermined amount, the vehicle may attempt to rotate its wheels towards the latest trajectory for the vehicle such that when the one or more wheels are no longer slipping, the vehicle's wheels are properly oriented. In this regard, the vehicle's computing devices 110 may be constantly updating the vehicle's trajectory, and in some instances, may even take into consideration the characteristics of the slipping wheel. For instance, if the front tires are pushing or rather, slipping a little into a turn on a current trajectory and the vehicle is going to veer off of the current trajectory, getting back on that trajectory too quickly could result in a spin if the traction increases such as if the vehicle leaves the puddle. As such, the computing devices 110 may generate a trajectory that causes the vehicle to attempt to slow down on a slightly different geometry of a new path while still moving the vehicle along the route to the destination as discussed above. Once the one or more wheels are no longer slipping, the wheels can simply begin rolling in the correct direction for the new trajectory.

The predetermined amount of slippage may be based on time or angle of rotation (i.e. front wheels rotated for X milliseconds or Y number of degrees). Alternatively, the threshold may be a combined threshold based on vehicle position and time or angle (i.e. front wheels spun for X milliseconds and vehicle position now has Z meters error, indicating that that the vehicle had not moved forward along its trajectory as anticipated). The values of X, Y, and Z may also be correlated to the current speed of the vehicle.

Figure 8:
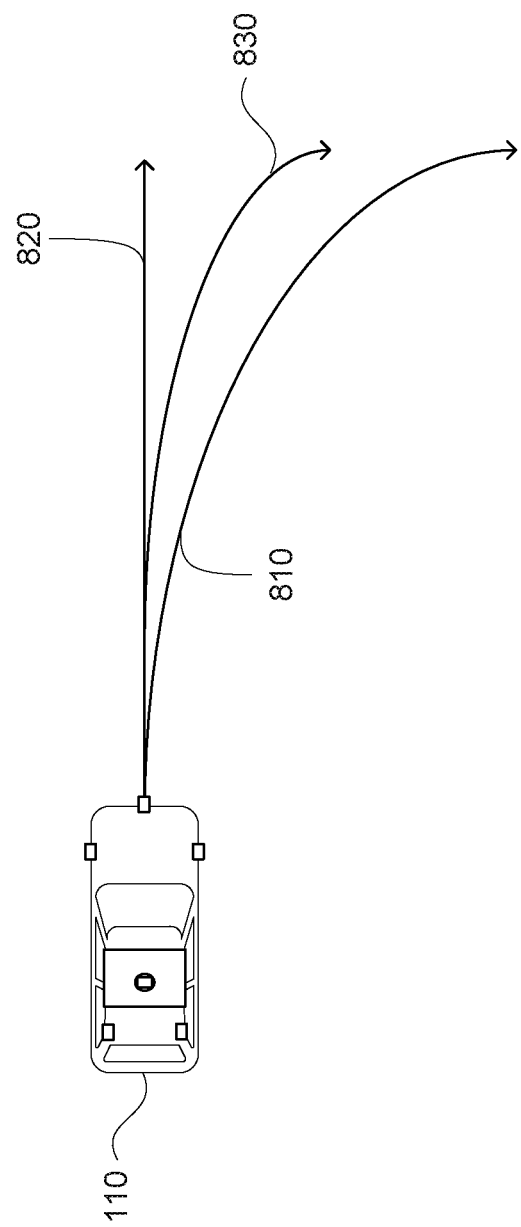
FIG. 8 is an example representation of a driving situation in accordance with aspects of the disclosure.

FIG. 8 is an example 800 of vehicle 100 while a wheel of the vehicle is slipping. Trajectory 810 represents a planned trajectory for the vehicle generated by the computing devices 110. Arrow 820 represents a heading of the vehicle during the slide. Arrow 830 represents the change in the steering of wheels 360 and/or 362 to orient the wheels towards the trajectory 810 in order to allow the vehicle to proceed towards the trajectory when the wheel is no longer slipping.

Figure 9:
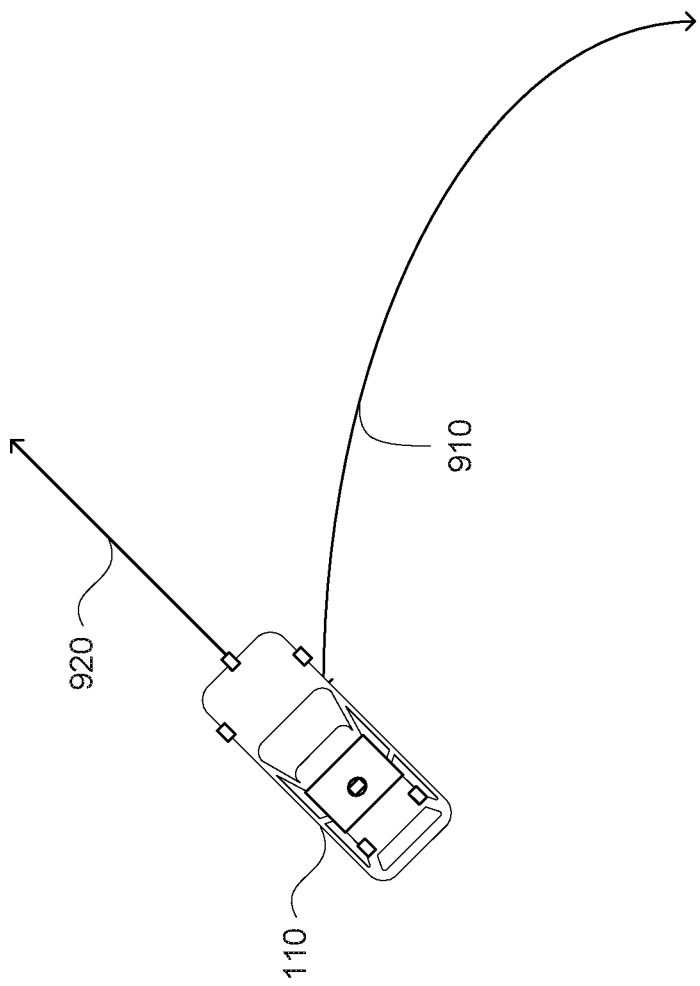
FIG. 9 is an example representation of a driving situation in accordance with aspects of the disclosure.

However, at some point, the vehicle's orientation may be such that the wheels can no longer be rotated towards the vehicle's current trajectory in order to follow the route. For instance, there may be a loss of traction in all of the vehicle's wheels, and the orientation of the steering may be at a maximum threshold value. At this point, the wheels may no longer be able to be rotated towards the vehicle's current trajectory in order to follow the route. This maximum threshold value may be dependent upon the amount of angular steering or turning radius of the vehicle. In addition or alternatively, the heading of the vehicle may be such that the wheels of the vehicle cannot physically be oriented towards the prior trajectory. For instance, FIG. 9 provides an example 900 of such a situation where the vehicle is sliding, for instance all four wheels are slipping, and the vehicle can no longer be steered towards a planned trajectory 910. In this case, arrow 920 represents a heading of the vehicle during the slide. As such gaining control of the vehicle becomes paramount to the safety of passengers and the vehicle, and thus, the wheels 360 and/or 362 may be steered in order to in order to regain traction so that the wheel is no longer slipping.

At this point, once the angle of the wheels can no longer be aligned with the prior or current planned trajectory, the vehicle's wheels may be rotated towards the heading of the vehicle while the vehicle is skidding in order to help the vehicle regain traction. This behavior may be automatic or may be caused by the computing devices 110 generating a new trajectory in order to regain control of the vehicle rather than following the route. Thereafter, once the vehicle regains traction, the vehicle can generate a new trajectory in order to follow the route. In addition, in situations where sliding occurs, the positioning system may no longer be able to immediately determine a precise position of the vehicle, as such, the computing devices 110 may automatically fallback to inertial estimates from a prior precise position when determining how to steer the vehicle.

Figure 10:
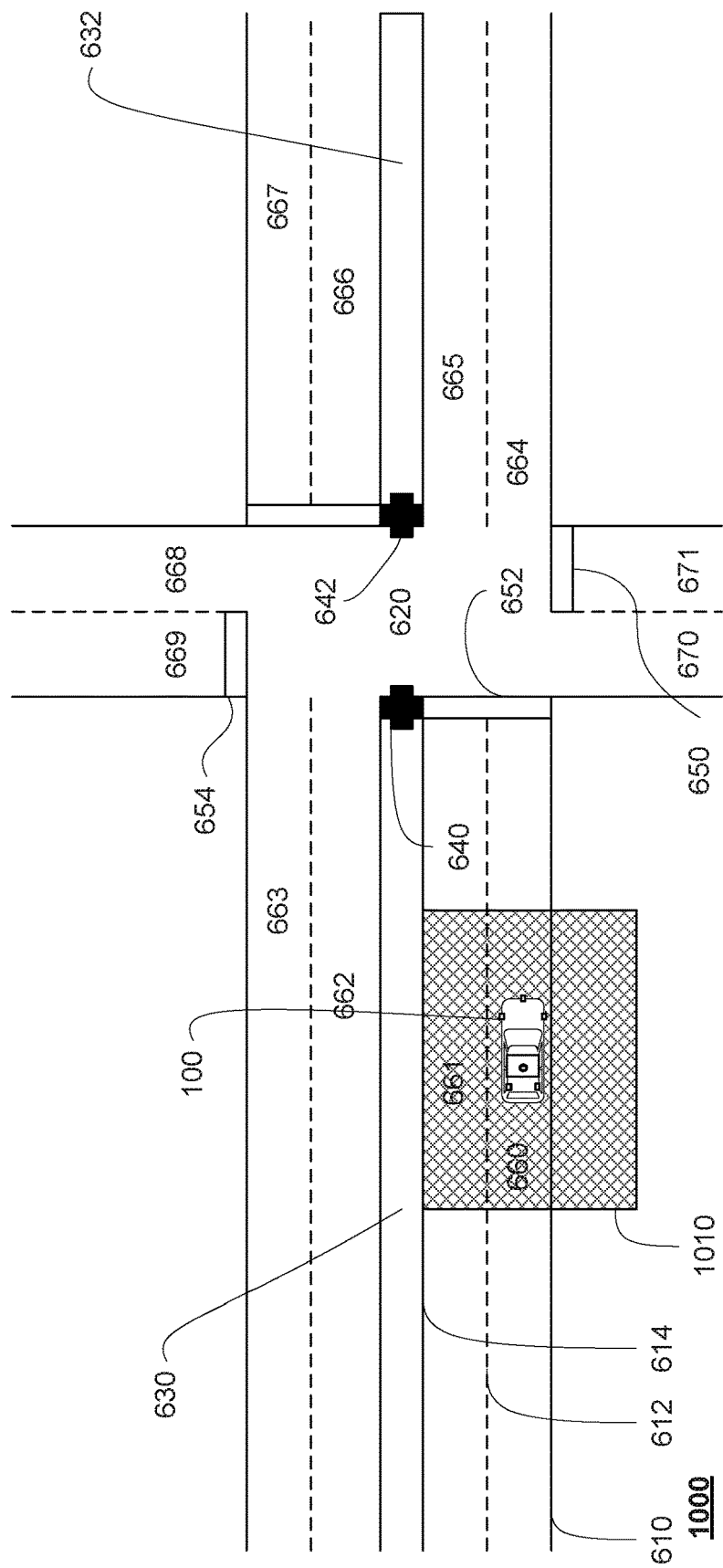
FIG. 10 is an example representation of a driving situation in accordance with aspects of the disclosure.

In some instances, when the estimated road friction is low and/or a wheel of the vehicle is slipping as discussed above, the computing devices 110 may identify a "safety zone" around current trajectory which allows for an increased buffer in movements and handling. For instance, the computing devices 110 may avoid driving directly adjacent to other vehicles in other lanes. In this regard, if the vehicle begins to slide, the vehicle will have some lateral and longitudinal buffer relative to other vehicles. FIG. 10 provides an example 1000 of vehicle 100 driving on roadway 600 approaching intersection 620. In this example, the computing devices may have determined that the estimated road friction is low and/or a wheel of the vehicle is slipping as discussed above. As such, the computing devices 110 may define a safety zone 1010 around the vehicle. The computing devices 110 may then attempt to control the vehicle in order limit the amount of time that other objects, such as other vehicles, pedestrians, bicyclists, etc. are within the safety zone and/or to control the vehicle such that those objects are never within the safety zone at all.

As another example, based upon the estimated road friction, the computing devices 110 may modify the vehicle's steering, acceleration and deceleration profiles and limits. For instance, the vehicle's computing device may reduce peak allowable acceleration for specific driving responses or reduce a limit on the rate of change of acceleration or the derivative of deceleration, referred to as "jerk". For example, if a vehicle is approaching a curve or planning a lane change, the computing devices 110 may limit the steering rate of change, acceleration, rate of change of acceleration, and/or velocity as needed to meet the aforementioned profiles and limits. As another instance, the computing devices 110 may assign a maximum steering angle as a function of velocity, estimated road friction, weight of the vehicle, etc.

The computing devices 110 may also send the estimated road friction and other data to remote computing devices, such as the server computing devices 110 and/or the computing devices of other vehicles of the fleet. This may allow these other computing devices to map low friction areas in real time.

With this information, vehicles of the fleet (or any vehicles with which the information is shared) could route themselves in order to avoid these areas, for instance, by re-routing, for some predetermined period of time, for instance, until temperatures rise, etc. If a vehicle is located within such areas, that computing devices 110 may avoid certain maneuvers in those areas or avoid routing on hills or sharp turns. For instance, if a low friction zone is upcoming in a vehicle's route, the computing devices 110 may accelerate or decelerate the vehicle to a proper speed prior to reaching that low friction area. For example, a detected low friction area, such as low friction area 280 of map information 200 which may correspond an ice patch before intersection 620, could mean the computing devices 110 slow the vehicle to a conservative stopping speed a known distance before the patch. Similarly, having the mapped information may allow the vehicle to drive even more cautiously, such as by taking turns more slowly, accelerating or decelerating mode gradually, etc. by modifying the vehicle's steering, acceleration and deceleration profiles and limits as discussed above. In addition, if a vehicle is approaching an expected low friction area, the computing devices 110 may increase the error tolerance of localization and positioning system (which normally expects precise positions).

When providing transportation services, the aforementioned map information may allow the vehicle to avoid pickup and drop-offs of passengers that overlap with low friction areas. For instance, the computing devices 110 may stop the vehicle earlier or later, based on the severity and size of a low friction area. For instance, returning to FIG. 2, if the map information indicates that a pickup location is within low friction area 280, the vehicle may be controlled in order to stop before or after low friction area.

To avoid inconvenience to the passenger, a notification may be sent to the passenger to indicate that the vehicle may need to expand an expected pickup or drop off area based on low friction conditions in the area. This, in turn, may cause dispatching server computing devices to increase user wait times and estimated times of arrival when low friction conditions are expected (via weather information) or observed (via on-vehicle sensors). In addition, such conditions may also be used to adjust the number of vehicles of a fleet on the road. In other words, more or less vehicles may be needed in order to meet typical demand.

Figure 11:
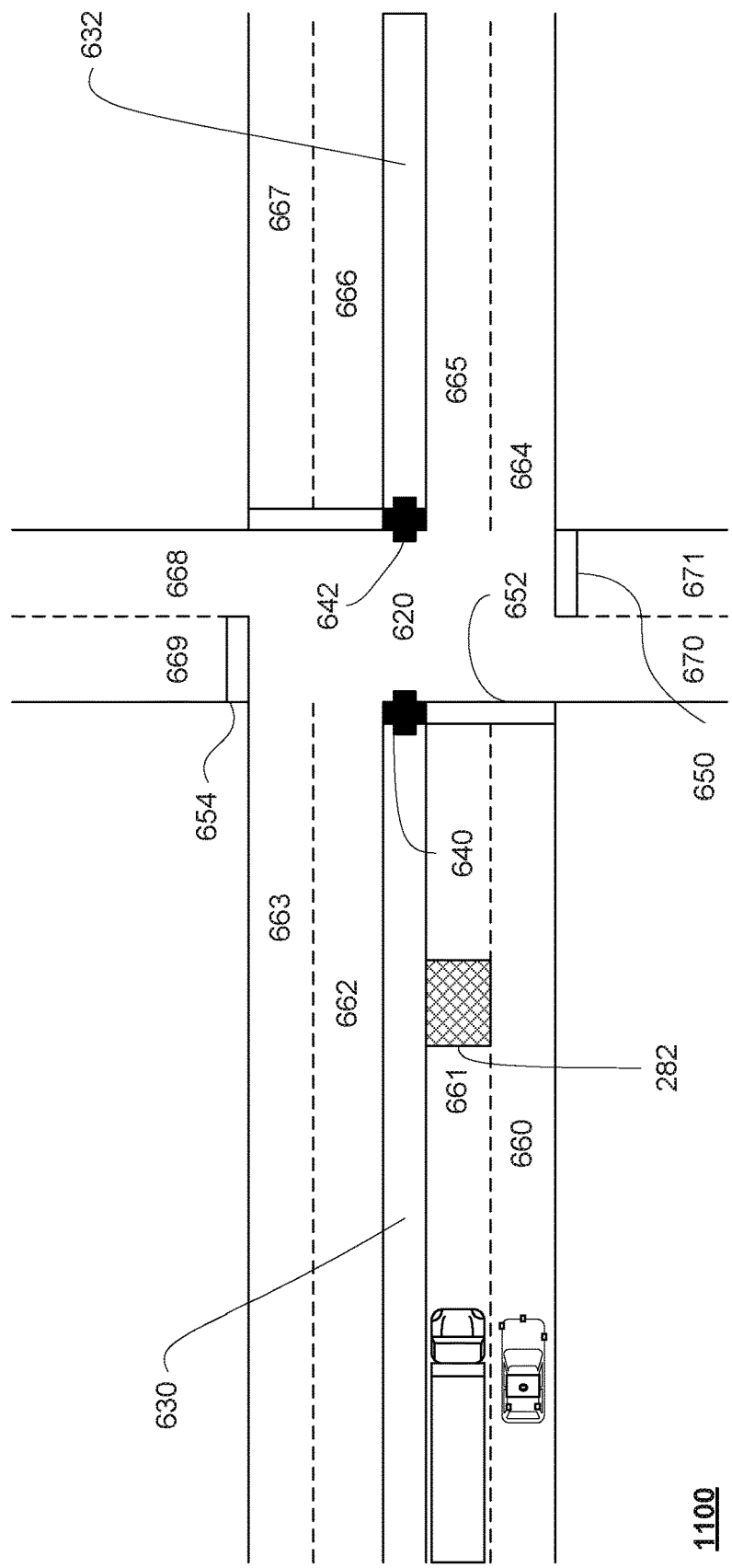
FIG. 11 is an example representation of a driving situation in accordance with aspects of the disclosure.

In addition, the computing devices 110 may use the estimated road friction to adjust how the vehicle interacts with other objects. For instance, the computing devices 110 may adjust the vehicle's algorithms or behavior models that predict how other road users will move, react, etc. As shown in example 1100 of FIG. 11, if a low friction area is detected or expected (such as low friction area 282 of the map information 200) in the vehicle's current lane, lane 660, and a large vehicle, such as a truck, is passing the vehicle on the left in lane 661, the computing devices 110 can estimate an increased buffer in the truck's potential stopping distance based on the estimated road friction. If the vehicle needs to merge into the left lane, here lane 661, and the vehicle's speed does not match the truck's, the computing devices 110 should control the vehicle in order to merge behind the truck and/or wait until after the truck and the vehicle have passed over or by the low friction area.

Figure 12:
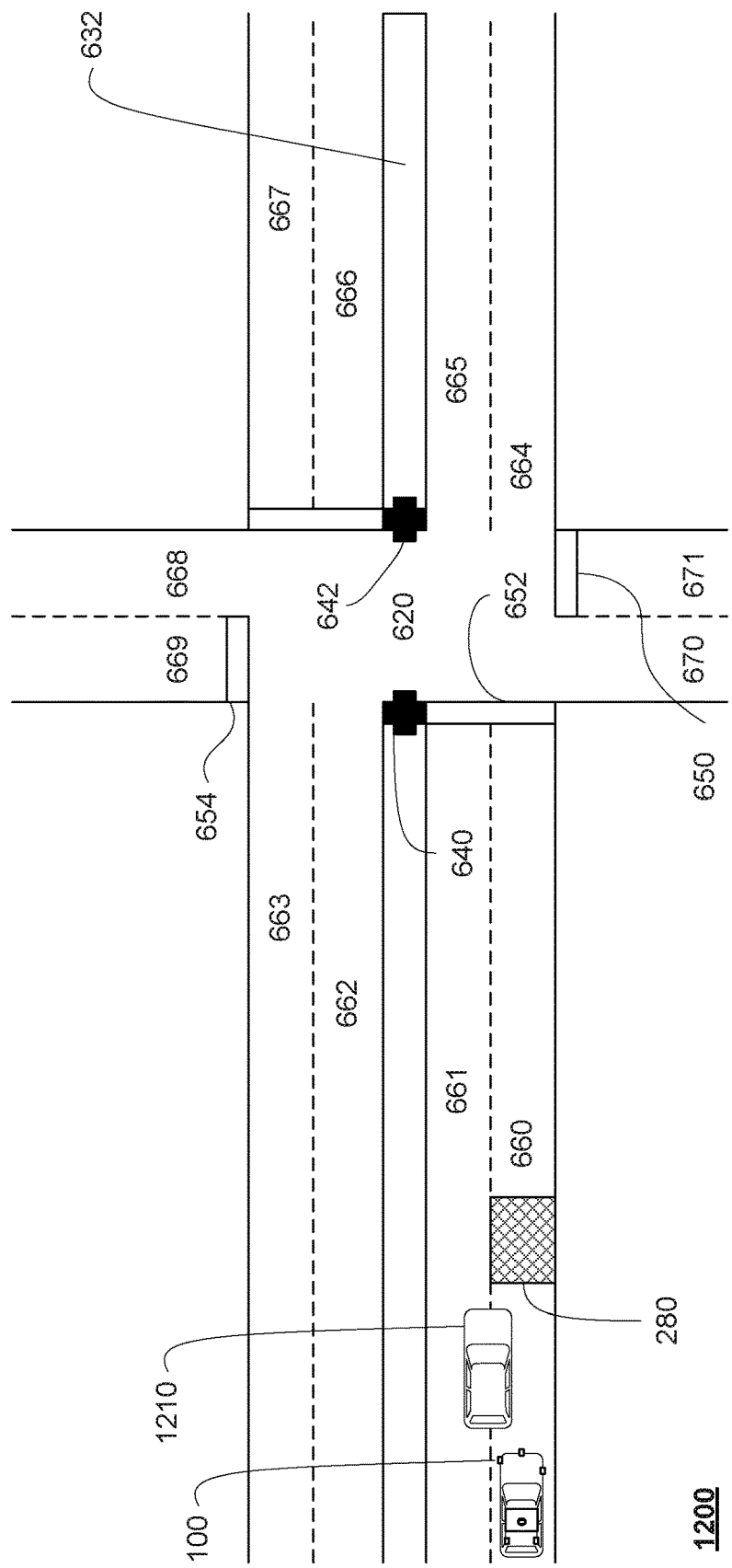
FIG. 12 is an example representation of a driving situation in accordance with aspects of the disclosure.

As another example, if the computing devices 110 detects low friction or expects a low friction area in the vehicle's lane and another vehicle is merging or taking a right turn into the vehicle's lane in front of the vehicle, trajectory predictions for that other vehicle should include that the other may slide or have decreased control. For instance, as shown in example 1200 of FIG. 12, vehicle 1210 may be attempting to enter into lane 660 in front of vehicle proximate to low friction area 280. As such, the computing devices 110 may slow vehicle 100 down in order to increase the distance between vehicle 100 and vehicle 1210. In other words, the computing devices 110 may expect greater uncertainty in predictions, resulting in a need for the vehicle to move to the left lane.

Figure 13:
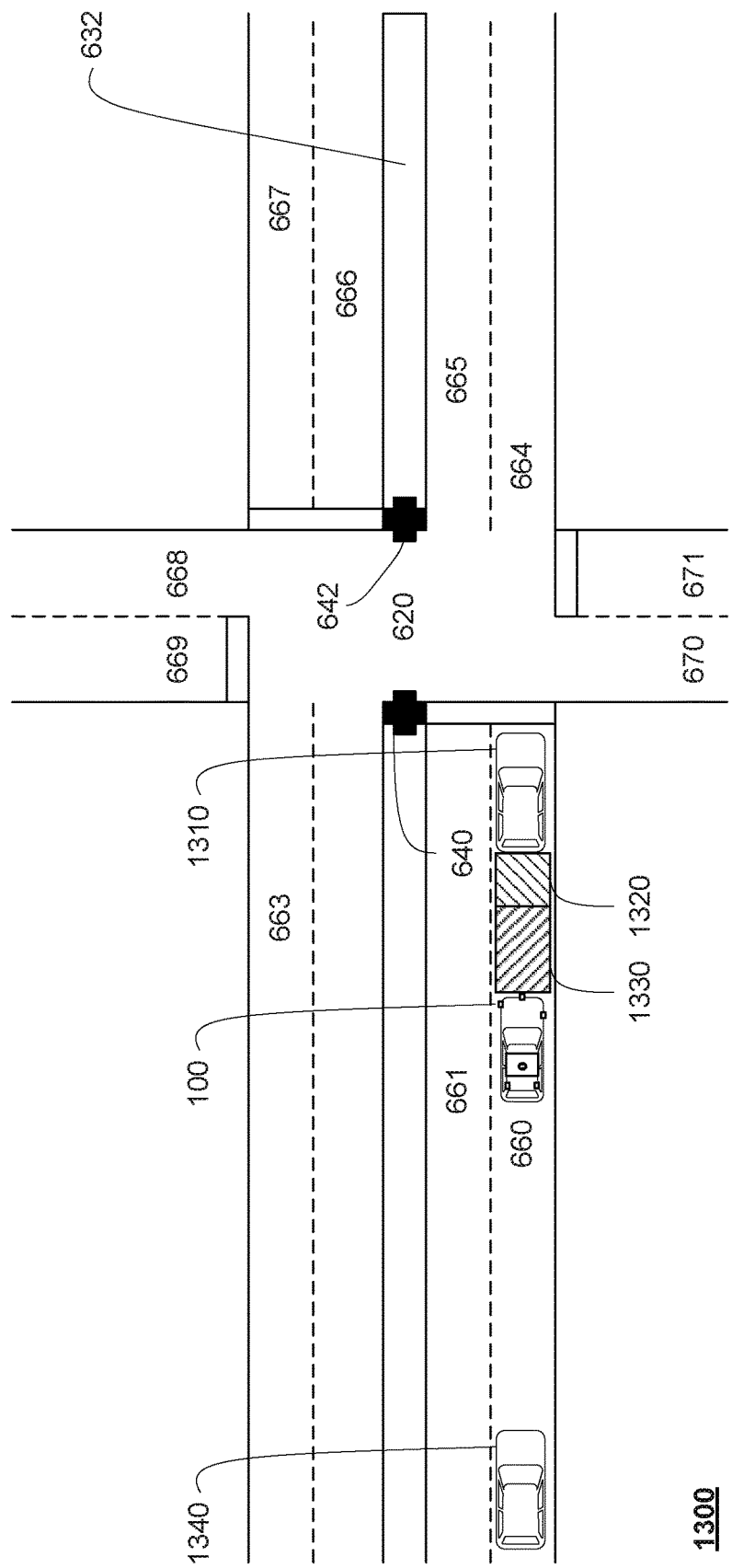
FIG. 13 is an example representation of a driving situation in accordance with aspects of the disclosure.

As another example, in dry conditions the computing devices 110 might leave a set buffer distance between the vehicle 100 and another vehicle when stopped at traffic lights. In low friction conditions, the computing devices 110 might increase that distance by an additional buffer distance. For instance, as shown in example 1300 of FIG. 13, vehicle 100 is stopped behind vehicle 1310 at intersection 620. Area 1320 represents a buffer distance for dry conditions. In this example, however, computing devices 110 may have detected low friction or expect low friction based on the map information. As such, the computing devices have added an additional buffer distance represented by area 1330 between vehicle 100 and vehicle 1310. In this regard, as a third vehicle 1340 is approaching the vehicle from behind too quickly to stop in time (given our prior knowledge/mapping of low friction conditions), the computing devices 110 may move the vehicle forward and use up the additional buffer distance.

In addition, by incorporating machine learning into the estimated road friction data gathered over time, observed low friction patterns on a map can be used to anticipate those hazardous driving areas. For instance, the machine learning can be combined with observed weather data. If weather conditions are right to form ice on the roads and we start to detect a typical ice pattern on the road, the computing devices 110 may anticipate that ice will form in typical places like over bridges, in shadows, in poor drainage areas, etc. For example, (without detecting that it is raining) these methods could map low friction areas created by puddles. In the future, when the vehicle suddenly passes over enough puddles to indicate a significant change from the expected friction levels (i.e. that it is raining), the computing devices 110 can expect puddles in the "usual" spots thanks to previously detected patterns. Similar applications of machine learning could be implemented to monitor and anticipate road wear, ice patches, etc.

Figure 14:
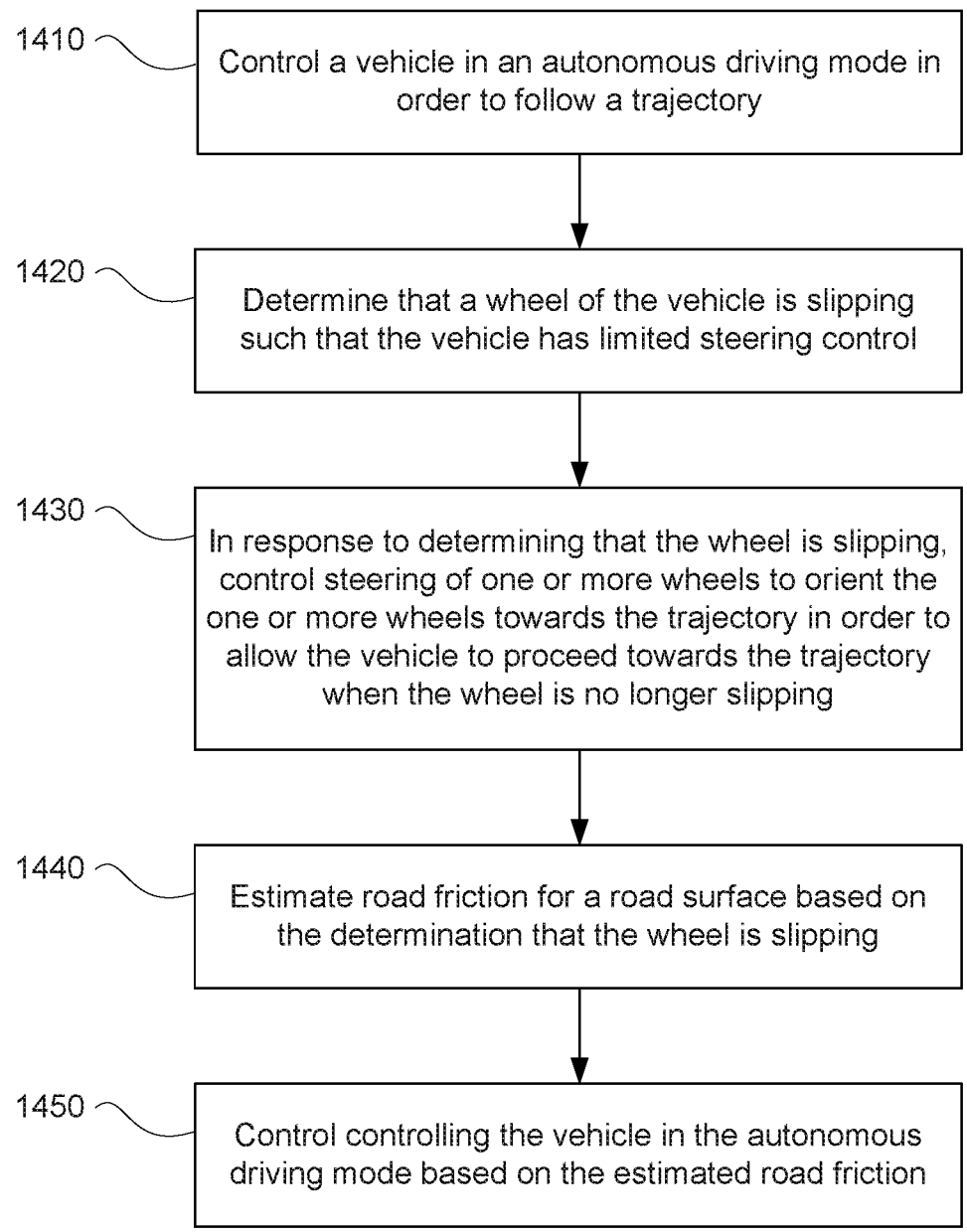
FIG. 14 is an example flow diagram in accordance with aspects of the disclosure.

FIG. 14 includes an example flow diagram 1400 of some of the examples for assessing and responding to wheel slippage and estimating road friction, which may be performed by one or more processors such as processors of computing devices 110. In this example, at block 1410 a vehicle is controlled in an autonomous driving mode in order to follow a trajectory. A wheel of the vehicle is determined to be slipping such that the vehicle has limited steering control at block 1420. In response to determining that the wheel is slipping, steering of one or more wheels is controlled in order to orient the one or more wheels towards the trajectory in order to allow the vehicle to proceed towards the trajectory when the wheel is no longer slipping at block 1430. Road friction is estimated for a road surface based on the determination that the wheel is slipping at block 1440. At block 1450, the vehicle is controlled in the autonomous driving mode based on the estimated road friction.

The features described herein provide for a real time assessment of road friction. This, in turn, may be used to control the vehicle more safely and effectively in situations where the road friction is very low. Moreover, since the aforementioned methods can be frequently evaluated, small changes in the expected yaw angle or rotational wheel speed can be routinely updated to account for wheel wear and geographic location and changing road surfaces. In addition, the vehicle is able to assess the effect of road weather conditions (snow, ice, rain, etc.) on the vehicle without having to actually detect those conditions directly. These features, along with other information such as temperature, humidity, and other weather data, can be used over time to determine degrading friction conditions indicating the onset of icing, puddling, etc. to predict hazardous driving areas to avoid in the near future.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of assessing and responding to wheel slippage, the method comprising:
   controlling, by one or more processors, a vehicle in an autonomous driving mode in order to follow an initial trajectory along a route to a destination;
   receiving, by the one or more processors, a measured rotational wheel speed of each wheel of a plurality of wheels of the vehicle;
   determining, by the one or more processors, an expected rotational wheel speed for each wheel of the plurality of wheels, wherein the expected rotational wheel speed is determined based on actuation commands sent by the one or more processors to one or more systems of the vehicle in order to follow the initial trajectory;
   for each wheel of the plurality of wheels, comparing, by the one or more processors, the measured rotational wheel speed to the expected rotational wheel speed to determine wheel slippage;
   determining, by the one or more processors based on the determined wheel slippage of each wheel of the plurality of wheels, that one or more of the plurality of wheels of the vehicle is slipping at least a predetermined amount;
   in response to determining that the one or more of the plurality of wheels of the vehicle is slipping at least the predetermined amount:
      generating, by the one or more processors, a new trajectory in order to recover from the vehicle veering off the initial trajectory due to the slipping of the one or more of the plurality of wheels; and
      controlling steering, by the one or more processors, of the one or more of the plurality of wheels of the vehicle in order to orient the one or more of the plurality of wheels towards the new trajectory; and
   controlling, by the one or more processors, the vehicle in the autonomous driving mode in order to follow the new trajectory along the route to the destination.

2. The method of claim 1, wherein controlling the vehicle in order to follow the initial trajectory includes attempting to make a turn and wherein determining that the one or more of the plurality of wheels is slipping is based on a difference between an actual yaw angle of the vehicle and an expected yaw angle of the vehicle while attempting to make the turn.

3. The method of claim 2, further comprising, determining the expected yaw angle using a programmed driving sequence to establish a baseline performance for the vehicle.

4. The method of claim 2, further comprising, determining the expected yaw angle from a steering command for the vehicle.

5. The method of claim 2, further comprising, determining the expected yaw angle using an expected coefficient of friction for a road surface.

6. The method of claim 1, wherein controlling the vehicle in order to follow the initial trajectory includes attempting to accelerate or decelerate the vehicle and wherein determining that the one or more of the plurality of wheels is slipping is based on a change in a speed of the vehicle while attempting to make a turn.

7. The method of claim 6, further comprising determining the change in the speed of the vehicle while attempting to make the turn based on feedback from a wheel speed sensor of each of the plurality of wheels and a speed of the vehicle determined by the one or more processors.

8. The method of claim 1, wherein the new trajectory is periodically generated by the one or more processors, and the method further comprises:
determining that the steering of the one or more of the plurality of wheels can no longer be controlled to orient the one or more of the plurality of wheels towards the new trajectory; and
when the steering of the one or more of the plurality of wheels can no longer be controlled to orient the one or more of the plurality of wheels towards the new trajectory, steering the one or more of the plurality of wheels in order to regain traction.

9. The method of claim 8, wherein determining that the steering of the one or more of the plurality of wheels can no longer be controlled to orient the one or more of the plurality of wheels towards the new trajectory is further based on whether the steering of the one or more of the plurality of wheels has met a maximum threshold value corresponding to a steering limit of the vehicle.

10. The method of claim 8, wherein determining that the steering of the one or more of the plurality of wheels can no longer be controlled to orient the one or more of the plurality of wheels towards the new trajectory is further based on whether a heading of the vehicle is such that the one or more of the plurality of wheels of the vehicle cannot physically be oriented towards the new trajectory.

11. The method of claim 1, further comprising, using inertial estimates for the vehicle when steering the one or more of the plurality of wheels to orient the one or more of the plurality of wheels towards the new trajectory.

12. The method of claim 1, further comprising:
estimating road friction for a road surface based on the determination that the one or more of the plurality of wheels is slipping; and
controlling the vehicle in the autonomous driving mode based on the estimated road friction.

13. The method of claim 12, wherein controlling the vehicle in the autonomous driving mode based on the estimated road friction includes modifying steering, acceleration and deceleration profiles.

14. The method of claim 12, wherein controlling the vehicle in the autonomous driving mode based on the estimated road friction includes modifying steering, acceleration and deceleration limits.

15. The method of claim 12, further comprising, sending the estimated road friction to a remote server computing device.

16. The method of claim 15, further comprising:
receiving estimated road friction data generated by other vehicles from the remote server computing device identifying a low friction area; and
routing the vehicle in order to avoid the low friction area.

17. The method of claim 15, further comprising:
receiving estimated road friction data generated by other vehicles from the remote server computing device identifying a low friction area; and
when the vehicle is approaching the low friction area, increasing an error tolerance of localization of the vehicle.

18. The method of claim 12, wherein controlling the vehicle in the autonomous driving mode based on the estimated road friction includes adjusting how the vehicle responds to other vehicles.

19. The method of claim 18, wherein adjusting how the vehicle responds to other vehicles objects includes estimating that another object is likely to have decreased steering control.

20. The method of claim 18, wherein adjusting how the vehicle responds to other vehicles includes increasing a default buffer distance to a first, vehicle in front of the vehicle by an additional buffer distance, and reducing the additional buffer distance as a second vehicle approaches the vehicle from behind.

21. The method of claim 1, wherein the predetermined amount of slippage is based on time or angle of rotation of the one or more of the plurality of wheels.

22. The method of claim 1, wherein determining that one or more of the plurality of wheels of the vehicle is slipping at least a predetermined amount includes detecting a difference in actual and expected rotational speeds of the one or more of the plurality of wheels.

23. The method of claim 1, wherein controlling the vehicle in the autonomous driving mode in order to follow the new trajectory includes slowing the vehicle down.

* * * * *